United States Patent
Lee et al.

(10) Patent No.: US 8,554,472 B2
(45) Date of Patent: Oct. 8, 2013

(54) ELECTRONIC DEVICE AND METHOD FOR INDICATING POSITION OF THE ELECTRONIC DEVICE ON ELECTRONIC MAP

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 25 days.

(21) Appl. No.: 12/967,076

(22) Filed: Dec. 14, 2010

(65) Prior Publication Data

US 2012/0016579 A1 Jan. 19, 2012

(30) Foreign Application Priority Data

Jul. 14, 2010 (TW) .............................. 99123063 A

(51) Int. Cl.
*G01C 21/12* (2006.01)
(52) U.S. Cl.
USPC ....................... 701/412; 701/460; 340/995.26
(58) Field of Classification Search
USPC .......... 701/538, 412, 460, 468; 123/492, 480, 123/493, 406.65, 486
See application file for complete search history.

(56) References Cited

U.S. PATENT DOCUMENTS

| | | | |
|---|---|---|---|
| 6,366,856 B1 * | 4/2002 | Johnson | 701/454 |
| 6,529,828 B1 * | 3/2003 | Williams et al. | 701/457 |
| 2009/0306889 A1 * | 12/2009 | Lin | 701/208 |
| 2010/0088532 A1 * | 4/2010 | Pollock et al. | 713/324 |

* cited by examiner

*Primary Examiner* — Thomas Black
*Assistant Examiner* — Luke Huynh
(74) *Attorney, Agent, or Firm* — Altis & Wispro Law Group, Inc.

(57) ABSTRACT

An indication method indicates position of an electronic device on an electronic map. The electronic device includes a global positioning system (GPS) and an e-compass. The method detects a position and an orientation of the electronic device using the GPS and the e-compass, indicates the detected position on an electronic map on a display screen of the electronic device, and marks the detected position and the detected orientation of the electronic device in the electronic map. Upon the condition that the detected direction is initialized, a default orientation of the electronic device is pointed North and the electronic map is initially oriented accordingly, the indication method then adjusts the electronic map as needed according to the detected orientation of the electronic device, and displays the adjusted electronic map on the display screen.

15 Claims, 5 Drawing Sheets

ELECTRONIC DEVICE AND METHOD FOR INDICATING POSITION OF THE ELECTRONIC DEVICE ON ELECTRONIC MAP

BACKGROUND

1. Technical Field

Embodiments of the present disclosure generally relate to electronic map indicating devices and methods, and more particularly to an electronic device and method for indicating position of the electronic device on an electronic map.

2. Description of Related Art

Electronic maps are commonly used in electronic devices, such as mobile phones and personal digital assistants (PDA). An electronic device can detect a present location of the electronic device using a global positioning system (GPS), and display the location on an electronic map. In many such electronic devices, the electronic map is always oriented so that north is towards the top of the display.

DETAILED DESCRIPTION

In general, the data "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
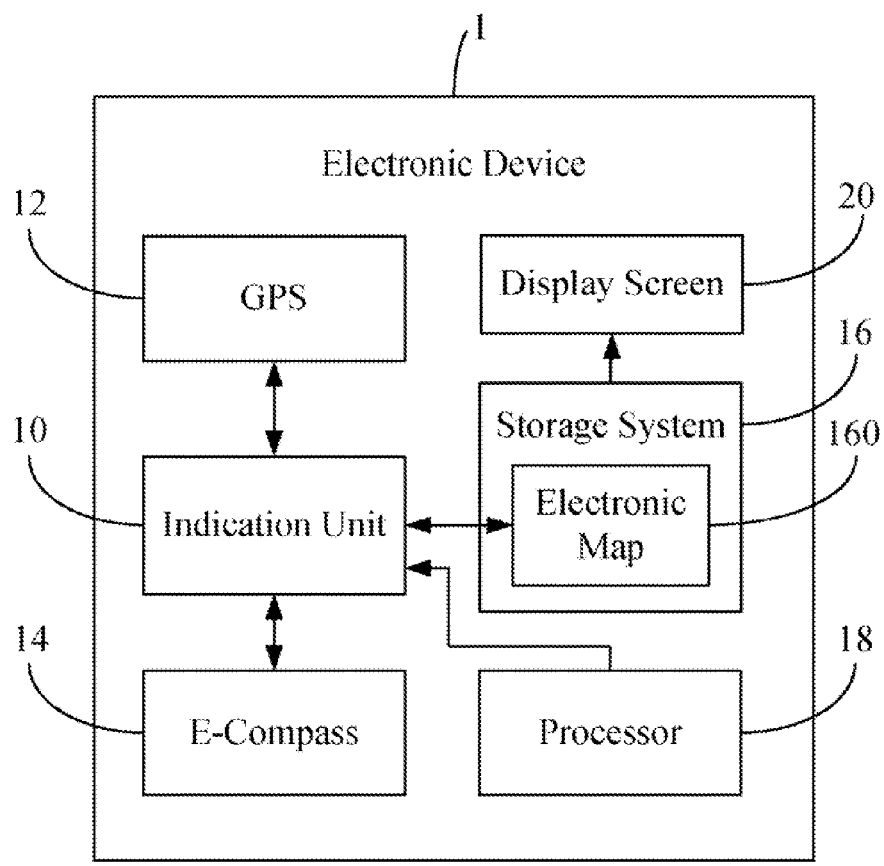
FIG. 1 is a block diagram of one embodiment of an electronic device included with an indication unit.

FIG. 1 is a block diagram of one embodiment of an electronic device 1. In the embodiment, the electronic device 1 is a portable device such as a mobile phone, a personal digital assistant (PDA), for example, and can indicate position of the electronic device 1 on an electronic map 160. The electronic device 1 includes an indication unit 10, a global positioning system (GPS) 12, an e-compass 14, a storage system 16, at least one processor 18, and a display screen 20. The indication unit 10 is programmed to locate a position of the electronic device 1 on the electronic map 160, and indicate the position and an orientation of the electronic device 1 on the electronic map 160. Upon the condition that the electronic device 1 is not pointed North (e.g., a top portion of the electronic device 1 or a display of the electronic device 1 is not pointed North), the indication unit 10 further adjusts the electronic map 160 according to the orientation, and displays the adjusted electronic map on the display screen 20. In the embodiment, the position of the electronic device 1 is detected by the GPS 12, and the orientation of the electronic device 1 is detected by the e-compass 14.

Figure 5:
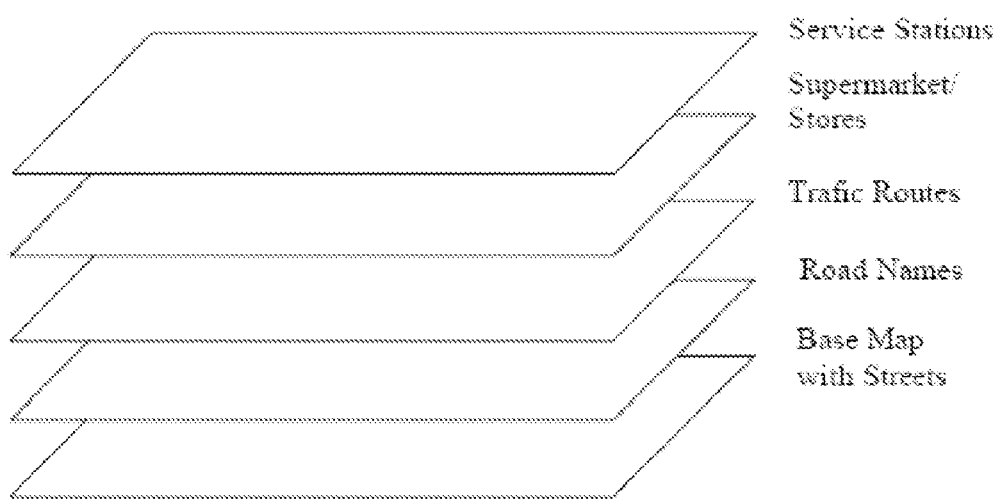
FIG. 5 is an example illustrating a selected subject of the electronic map.

In the embodiment, the electronic map 160 is stored in the storage system 16. As described in FIG. 5, the electronic map 160 includes a plurality of indication layers, and each of the indication layers has a subject, such as "service stations," "supermarkets and stores," "traffic routes," "road names," or "base map with streets," for example.

The GPS 12 is operable to detect a current position of the electronic device 1. The e-compass 14 is configured to detect orientation of the electronic device 1 relative to compass directions. In the embodiment, the e-compass 14 is different from a common compass in that the e-compass 14 has a magneto resistive transducer that is distinct from a magnetic needle of a common compass. Because of Lorentz force of the magneto resistive transducer, the e-compass 14 can calculate a voltage variation of a point charge, and determine orientation of the electronic device 1 according to the voltage variation.

Figure 2:
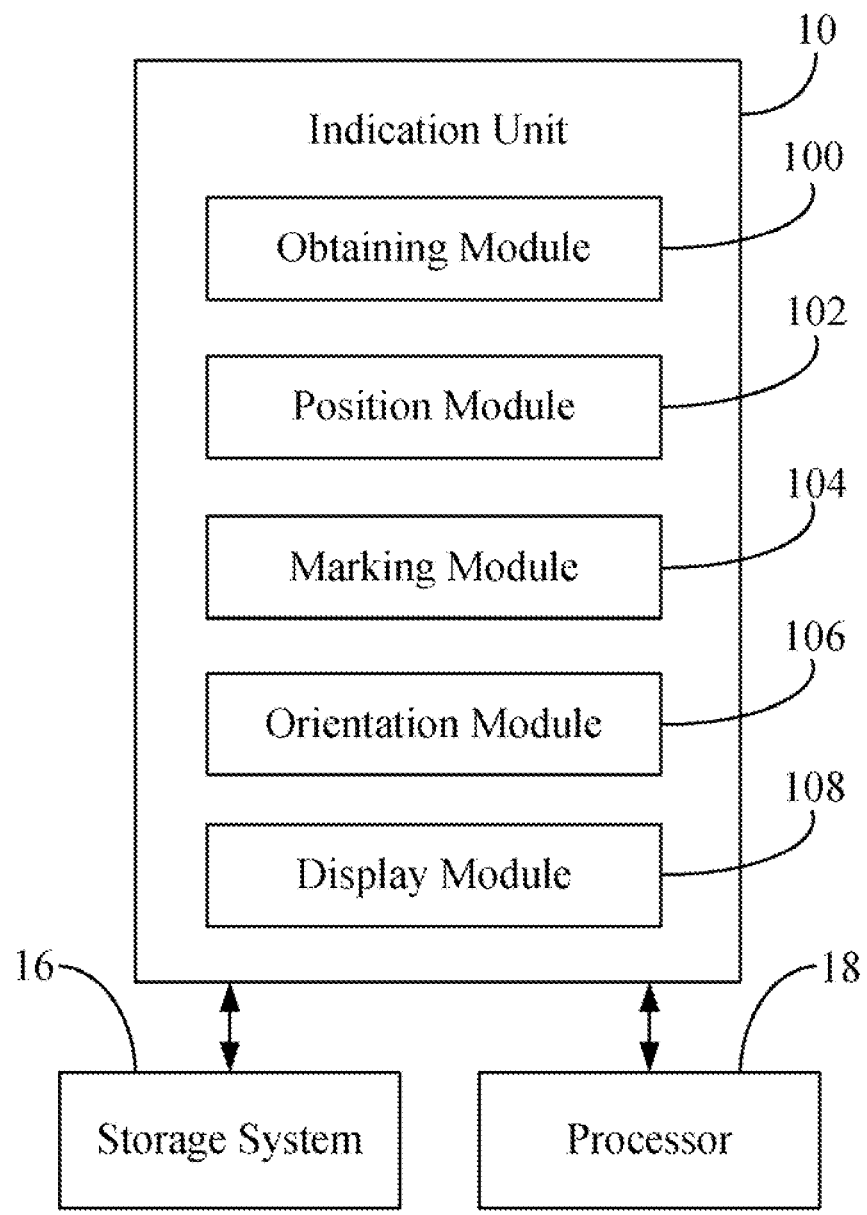
FIG. 2 is a block diagram of one embodiment of function modules of the indication unit of FIG. 1.

FIG. 2 is a block diagram of function modules of the indication unit 10 of FIG. 1. In one embodiment, the indication unit 10 includes an obtaining module 100, a position module 102, a marking module 104, an orientation module 106, and a displaying module 108. Each of the modules 100-108 may be a software program including one or more computerized instructions that are stored in the storage system 16 and executed by the processor 18.

Figure 4:
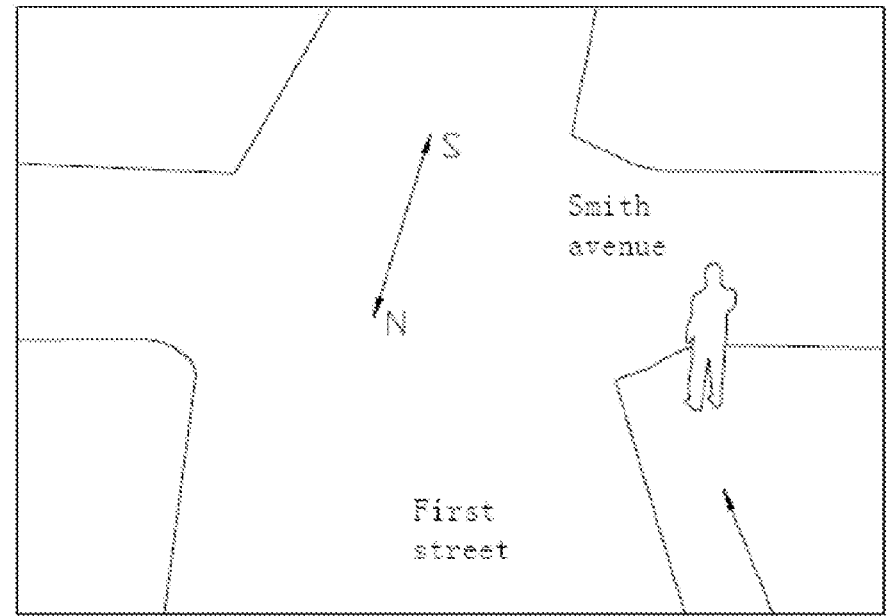
FIG. 4 is an example illustrating adjusting the electronic map.
Figure 4:
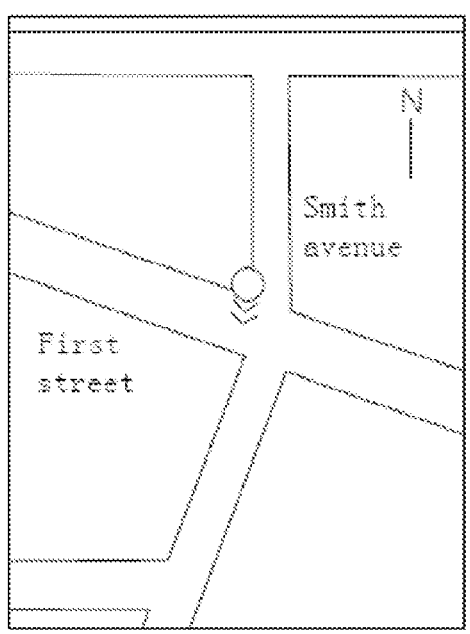
Figure 4:
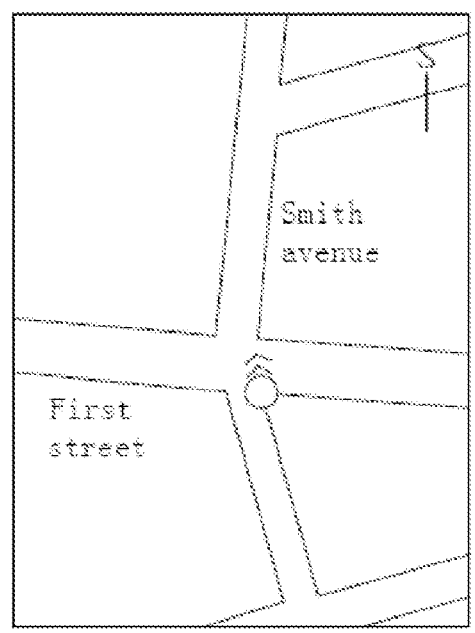

The obtaining module 100 is operable to obtain a position of the electronic device 1 detected by the GPS 12, and an orientation of the electronic device 1 detected by the e-compass 14. As shown in FIG. 4 (I), when a person uses the electronic device 1 at an intersection of First street and Smith Avenue and is facing South, the electronic device 1 can determine this information using the GPS 12 and the e-compass 14. The obtaining module 100 obtains the detected position of the electronic device 1 from the GPS 12, and obtains the detected orientation of the electronic device 1 from the e-compass 14.

The position module 102 indicates the detected position on the electronic map 160. In the embodiment, the position module 102 enlarges the electronic map 160, and indicates the detected position of the electronic device 1 on the display screen 20. For example, the position module 102 displays the intersection of First street and Smith avenue.

The marking module 104 marks the detected position and the detected orientation of the electronic device 1 on the electronic map 160. For example, as illustrated in FIG. 4 (II) and (III), the marking module 104 indicates the detected position with a small circle, and indicates the detected orientation of the electronic device 1 using arrowheads near the small circle. FIG. 4 (II) is an electronic map traditionally oriented with North at the top of the display screen 20. FIG. 4 (III) is the electronic map 160 oriented with the current orientation (South) of the electronic device 1 at the top, which is different from the electronic map 160 of FIG. 4 (II).

The orientation module 106 continuously adjusts orientation of the electronic map 160 according to detected orientation of the electronic device 1. In this embodiment, when the electronic map 160 is initialized, and a default orientation of the electronic device is pointed North and the electronic map is initially oriented accordingly, the orientation module 106 adjusts the electronic map 160 accordingly.

In one example of FIG. 4 (II), if the electronic device 1 is pointed south after previously pointing North, then the orientation module 106 reorients the electronic map 160 180 degrees so that south is displayed at the top of the display screen 20. In the embodiment, the electronic map 160 has a plurality of map views arranged in layers, and each layer is a kind of overlay, which can add words and symbols to indicate location and/or information of chosen types of landmarks herein called subjects. For example, a layer may present an informative view of all known hotels in the currently viewed area of the electronic map 160.

In detail, continuing with the example illustrated in FIG. 4, the orientation module 106 separates each of the layers of the electronic map 160 from others, and then adjusts the electronic map 160 180 degrees from North to South. The orientation module 106 rotates display angle of each map view in each of the layers 180 degrees so that the map views of layers of the electronic map 160 are displayed in keeping with the orientation of the user.

The displaying module 108 indicates the adjusted electronic map on the display screen 20.

Figure 3:
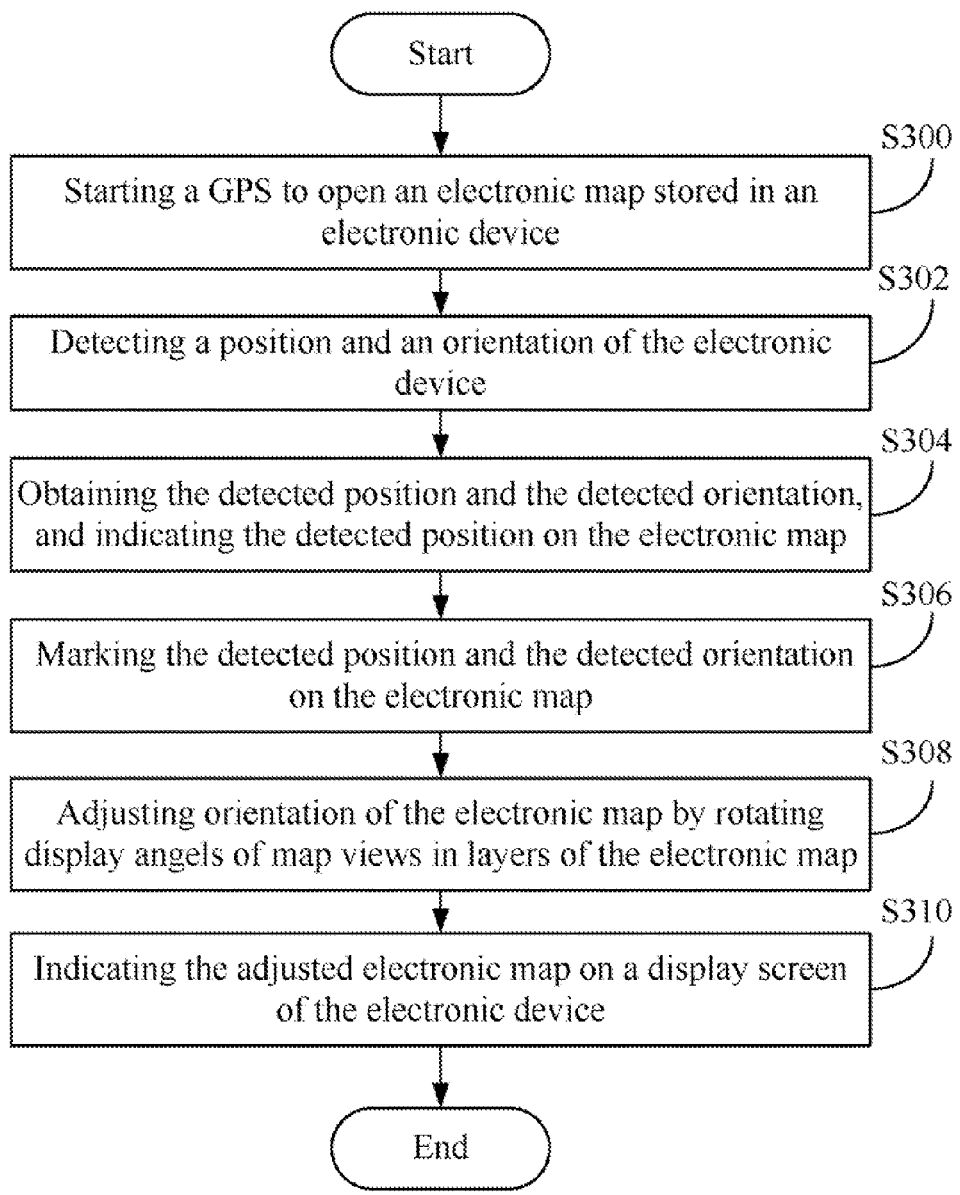
FIG. 3 is a flowchart illustrating one embodiment of a method of indicating position of the electronic device on an electronic map.

FIG. 3 is a flowchart illustrating one embodiment of a method of indicating positions of the electronic device 1 on the electronic map 160. Depending on the embodiment, additional blocks may be added, others removed, and the ordering of the blocks may be changed.

In block S300, the electronic device 1 starts the GPS 12 to open the electronic map 160 when the electronic device 1 is powered on.

In block S302, the GPS 12 detects a position of the electronic device 1, and the e-compass 14 detects an orientation of the electronic device 1. In the embodiment, the detected orientation of the electronic device 1 is defined as a direction that a user of the electronic device 1 faces.

In block S304, the obtaining module 100 obtains the detected position and the detected orientation, the position module 102 indicates the detected position on the electronic map 160. For example, the position module 102 enlarges the electronic map 160, and displays the detected position.

In block S306, the marking module 104 marks the detected position and the detected orientation on the electronic map 160. For example, as illustrated in FIG. 4 (II) and (III), the marking module 104 indicates the detected position using a small circle, and indicates the detected orientation of the electronic device 1 using arrowheads near the small circle. In FIG. 4 (III), the arrowheads are oriented to the current orientation of the electronic device 1, and the electronic map 160 is oriented with the current orientation (South) of the electronic device 1 at the top.

Upon the condition that the electronic map 160 is initialized, and a default orientation of the electronic device is pointed North and the electronic map is initially oriented accordingly, in block S308, the orientation module 106 continuously adjusts orientation of the electronic map 160 according to the detected orientation of the electronic device 1. In the embodiment, the orientation module 106 adjusts the electronic map 160 by rotating display angles of map views arranged in layers of the electronic map 160 to accord with the detected direction.

In block S310, the display module 108 indicates the adjusted electronic map 160 on the display screen 20.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for indicating position of an electronic device on an electronic map, the electronic device comprising a global positioning system (GPS) and an e-compass, the method comprising:

detecting a position of the electronic device by the GPS, and detecting an orientation of the electronic device by the e-compass;

indicating the detected position on the electronic map on a display screen of the electronic device, the electronic map comprising a plurality of map views arranged in layers, and each of the layers having an overlay, which adds words and symbols on the electronic map to indicate location and information of chosen landmarks;

marking the detected position and the detected orientation of the electronic device on the electronic map;

upon the condition that the detected direction is initialized, a default orientation of the electronic device is pointed North and the electronic map is initially oriented accordingly, continuously adjusting orientation of the electronic map according to the detected orientation of the electronic device; and indicating the adjusted electronic map on the display screen.

2. The method as described in claim 1, wherein each of the layers has a subject.

3. The method as described in claim 1, wherein the adjusting step comprises:

rotating display angles of the map views in each of the layers to accord with the detected orientation.

4. The method as described in claim 1, wherein the e-compass comprises a magneto resistive transducer.

5. The method as described in claim 1, wherein the electronic device is a mobile phone, a personal digital assistant (PDA), or a portable device.

6. An electronic device, comprising:

a global positioning system (GPS) operable to detect a position of the electronic device;

an e-compass operable to detect an orientation of the electronic device relative to compass directions; and one or more modules stored in a storage system and configured for execution by one or more processors, the one or more modules comprising:

an obtaining module that obtains the detected position from the GPS, and receives the detected orientation from the e-compass;

a position module that indicates the detected position on an electronic map on a display screen of the electronic device, the electronic map comprising a plurality of map views arranged in layers, and each of the layers having an overlay, which adds words and symbols on the electronic map to indicate location and information of chosen landmarks;

a marking module that marks the detected position and the detected orientation of the electronic device on the electronic map;

an orientation module that adjusts orientation of the electronic map according to the detected orientation of the electronic device, upon the condition that the detected direction is initialized, a default orientation of the electronic device is pointed North and the electronic map is initially oriented accordingly; and a displaying module that indicates the adjusted electronic map on the display screen.

7. The electronic device as described in claim 6, wherein each of the layers has a subject.

8. The electronic device as described in claim 6, wherein the orientation module further rotates display angles of the map views in each of the layers to accord with the detected orientation.

9. The electronic device as described in claim 6, wherein the e-compass comprises a magneto resistive transducer.

10. The electronic device as described in claim 6, wherein the electronic device is a mobile phone, a personal digital assistant (PDA), or a portable device.

11. A non-transitory storage medium having stored thereon instructions that, when executed by at least one processor of an electronic device, to perform a method for indicating position of the electronic device on an electronic map, the method comprising:

detecting a position of the electronic device by the GPS, and detecting an orientation of the electronic device by the e-compass;

indicating the detected position on the electronic map on a display screen of the electronic device, the electronic map comprising a plurality of map views arranged in layers, and each of the layers having an overlay, which adds words and symbols on the electronic map to indicate location and information of chosen landmarks;

marking the detected position and the detected orientation of the electronic device on the electronic map;

upon the condition that the detected direction is initialized, a default orientation of the electronic device is pointed North and the electronic map is initially oriented accordingly, continuously adjusting orientation of the electronic map according to the detected orientation of the electronic device; and indicating the adjusted electronic map on the display screen.

12. The storage medium as described in claim 11, wherein each of the layers has a subject.

13. The storage medium as described in claim 11, wherein the adjusting step comprises:

rotating display angles of the map views in each of the layers to accord with the detected orientation.

14. The storage medium as described in claim 11, wherein the e-compass comprises a magneto resistive transducer.

15. The storage medium as described in claim 11, wherein the electronic device is a mobile phone, a personal digital assistant (PDA), or a portable device.

* * * * *